US009482841B2

(12) United States Patent
Rose

(10) Patent No.: US 9,482,841 B2
(45) Date of Patent: Nov. 1, 2016

(54) CABLE INSTALLATION DEVICE

(71) Applicant: Craig Alan Rose, Cumming, GA (US)

(72) Inventor: Craig Alan Rose, Cumming, GA (US)

(*) Notice: Subject to any disclaimer, the term of this patent is extended or adjusted under 35 U.S.C. 154(b) by 234 days.

(21) Appl. No.: 14/284,048

(22) Filed: May 21, 2014

(65) Prior Publication Data
US 2015/0309281 A1 Oct. 29, 2015

Related U.S. Application Data

(63) Continuation-in-part of application No. 29/455,449, filed on May 21, 2013, now Pat. No. Des. 727,707, and a continuation-in-part of application No. 29/459,361, filed on Jun. 28, 2013, now Pat. No. Des. 744,309.

(60) Provisional application No. 61/825,618, filed on May 21, 2013.

(51) Int. Cl.
G02B 6/44 (2006.01)

(52) U.S. Cl.
CPC ............ *G02B 6/4497* (2013.01); *G02B 6/4495* (2013.01)

(58) Field of Classification Search
CPC .... G02B 6/4497; G02B 6/4495; H02G 1/12; H02G 1/1243; H02G 1/12; H02G 1/1209; B65H 2701/32
USPC ............................................... 81/9.4
See application file for complete search history.

(56) References Cited

U.S. PATENT DOCUMENTS

| | | | | |
|---|---|---|---|---|
| 5,230,260 A | * | 7/1993 | Bell | H02G 1/12 29/403.3 |
| 6,401,570 B1 | * | 6/2002 | Nadeau | H02G 1/1243 30/90.4 |
| 7,198,222 B2 | * | 4/2007 | Rydalch | B65H 54/58 242/608.4 |
| 7,228,763 B2 | * | 6/2007 | Hughes | H02G 1/1248 81/9.4 |
| 2001/0029814 A1 | * | 10/2001 | Tiano | G02B 6/4497 81/119 |

* cited by examiner

*Primary Examiner* — Hadi Shakeri
(74) *Attorney, Agent, or Firm* — Antonio Papageorgiou; Meister Seelig & Fein LLP

(57) ABSTRACT

A method and apparatus for installing optical fiber cable. The apparatus comprises a cable installation device that includes a structure having a central axis with a length having a left and right end permitting a hole and a left and right slot with chamfered edges, capable of being inserted into a rotary tool and used to remove a ripcord from an optical fiber cable.

7 Claims, 3 Drawing Sheets

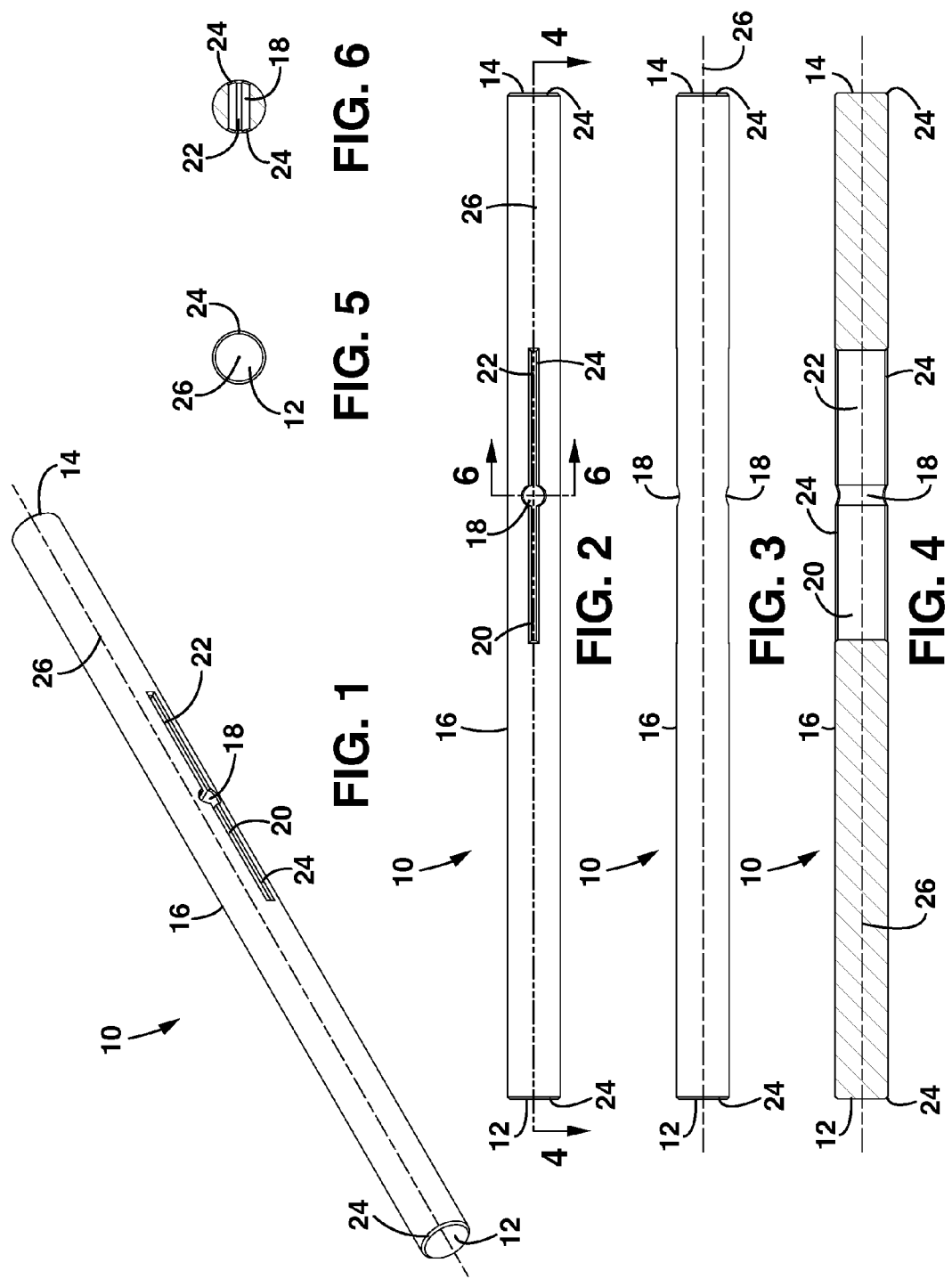

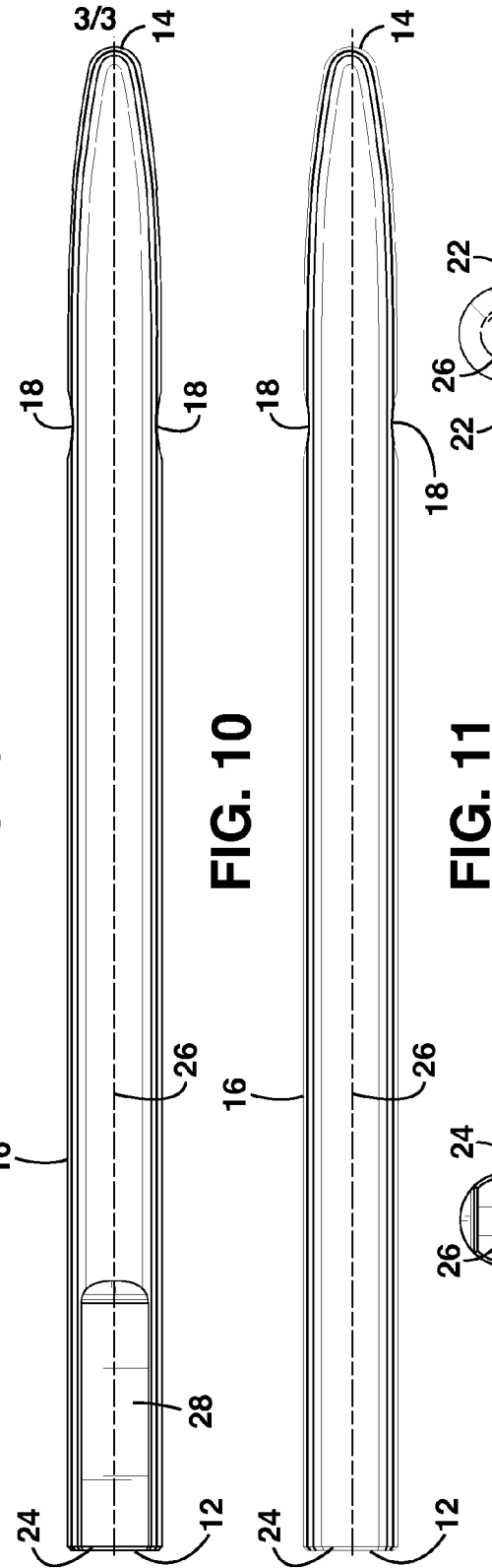

CABLE INSTALLATION DEVICE

CROSS REFERENCE TO RELATED APPLICATION

This application claims the priority of U.S. Provisional Application No. 61/825,618, entitled "CABLE INSTALLATION DEVICE," filed on May 21, 2013, U.S. Design Pat. application No. 29/455,449, entitled "CABLE INSTALLATION DEVICE," filed on May 21, 2013, and U.S. Design Pat. application No. 29/459,361, entitled "CABLE INSTALLATION DEVICE," filed on Jun. 28, 2013, the disclosure of which are hereby incorporated by reference in their entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The invention described herein generally relates to cable installation devices, in particular to those devices used to install optical fiber cable.

2. Description of the Related Art

Optical fiber cable is available in more than one particular construction. Primarily the construction of optical fiber cable is a bundle of optical fibers packaged in a core surrounded by a cladding and coating. More commonly, there are two basic types of optical fiber cable construction known as tight buffered cable and loose tube cable. Loose tube cable is structured of the following elements: multiple 250 um coated bare fibers (in loose tube), one or more loose tubes holding 250 um bare fibers, loose tubes strand around the central strength member, moisture blocking gel in each loose tube for water blocking and protection of 250 um fibers, central strength member (in the center of the cable and is stranded around by loose tubes), aramid yarn as a strength member, ripcord (for removal of outer jacket), and an outer jacket (polyethylene is most common for outdoor cables because of its moisture resistant, abrasion resistant and stable over wide temperature range characteristics).

The ripcord is a thin but very strong thread embedded just below the cable jacket. Its role is to split the cable easily without harming cable interiors. Loose Tube fiber optic cable comes in two types non-armored and armored. The state of the art in using the ripcord is to expose an amount of the ripcord, to be able to pull on it by use of the hand. This is a difficult, un-efficient, unsafe, time and labor consuming process to accomplish especially with armored cable. With armored cable use of the ripcord is nearly impossible. The metal inner armor sheath shears the ripcord after being pulled by hand, for a short distance, rendering the ripcord useless.

Accordingly there is a need for a cable installation device capable of easily utilizing the ripcord to split the cable easily, efficiently, safely in a time and labor saving way without harming cable interiors.

SUMMARY OF THE INVENTION

The present invention provides a method and apparatus for installing optical fiber cable. The apparatus comprises a cable installation device comprising a shaft length including a left end and a right end, at least one of the left and right end including a chamfer about the edge of the at least one of the left and right end and wherein at least one of the left and right end is engageable with a rotary tool, a through-going hole centered on a central axis of the shaft length between the left end and the right end adapted for receiving a ripcord of an optical fiber cable, and at least one through-going slot adjacent to the hole.

The cable installation device may be constructed from material comprising one of metal, plastic, wood, and carbon fiber. In one embodiment, the shaft length includes a circular profile, and in other embodiments, the shaft length may include one of a square, hexagonal, and octagonal profile. The shaft length can be about 7.5 inches. At least one of the left and right ends may include a diameter of about 0.50 inches. The chamfer may be about 0.03 inches wide about the edge of the profile.

According to one embodiment, the through-going hole is an oval having a first dimension of about. 0.22 inches wide and a second dimension of about 0.44 inches long and is centered about 2 to 3 inches from the right end. The at least one through-going slot can be about 0.07 inches in height and about 1.00 inches in length and may include a chamfer about 0.03 inches wide about the front and back edges of the at least one through-going slot.

The method comprises engaging a shank of a cable installation device with a securing element of a rotary tool, inserting a ripcord of an optical fiber cable through a hole of the cable installation device, sliding the ripcord into a slot of the cable installation device, and winding the ripcord about an outer perimeter of the cable installation device. The method further comprises activating the rotary tool to rotate the cable installation device about an axis to further wind the ripcord about the outer perimeter of the cable installation device and remove the ripcord from inside an outer jacket of the optical fiber cable to the outside of the optical fiber cable.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 1 illustrates a perspective view of the cable installation device according to an embodiment of the present invention;

FIG. 2 illustrates a front view of the cable installation device according to an embodiment of the present invention, the back view being opposite;

FIG. 3 illustrates a top view of the cable installation device according to an embodiment of the present invention, the bottom view being opposite;

FIG. 4 illustrates a section view of the cable installation device taken from FIG. 2 according to an embodiment of the present invention;

FIG. 5 illustrates a left side view of the cable installation device according to an embodiment of the present invention, the right side view being opposite;

FIG. 6 illustrates a section view of the cable installation device taken from FIG. 2 according to an embodiment of the present invention;

FIG. 8 illustrates a front view of the cable installation device according to another embodiment of the present invention;

FIG. 9 illustrates a rear view of the cable installation device according to another embodiment of the present invention;

FIG. 10 illustrates a top view of the cable installation device according to another embodiment of the present invention;

FIG. 11 illustrates a bottom view of the cable installation device according to another embodiment of the present invention;

FIG. 12 illustrates a left view of the cable installation device according to another embodiment of the present invention; and FIG. 13 illustrates right view of the cable installation device according to another embodiment of the present invention.

DETAILED DESCRIPTION OF THE INVENTION

Figure 7:
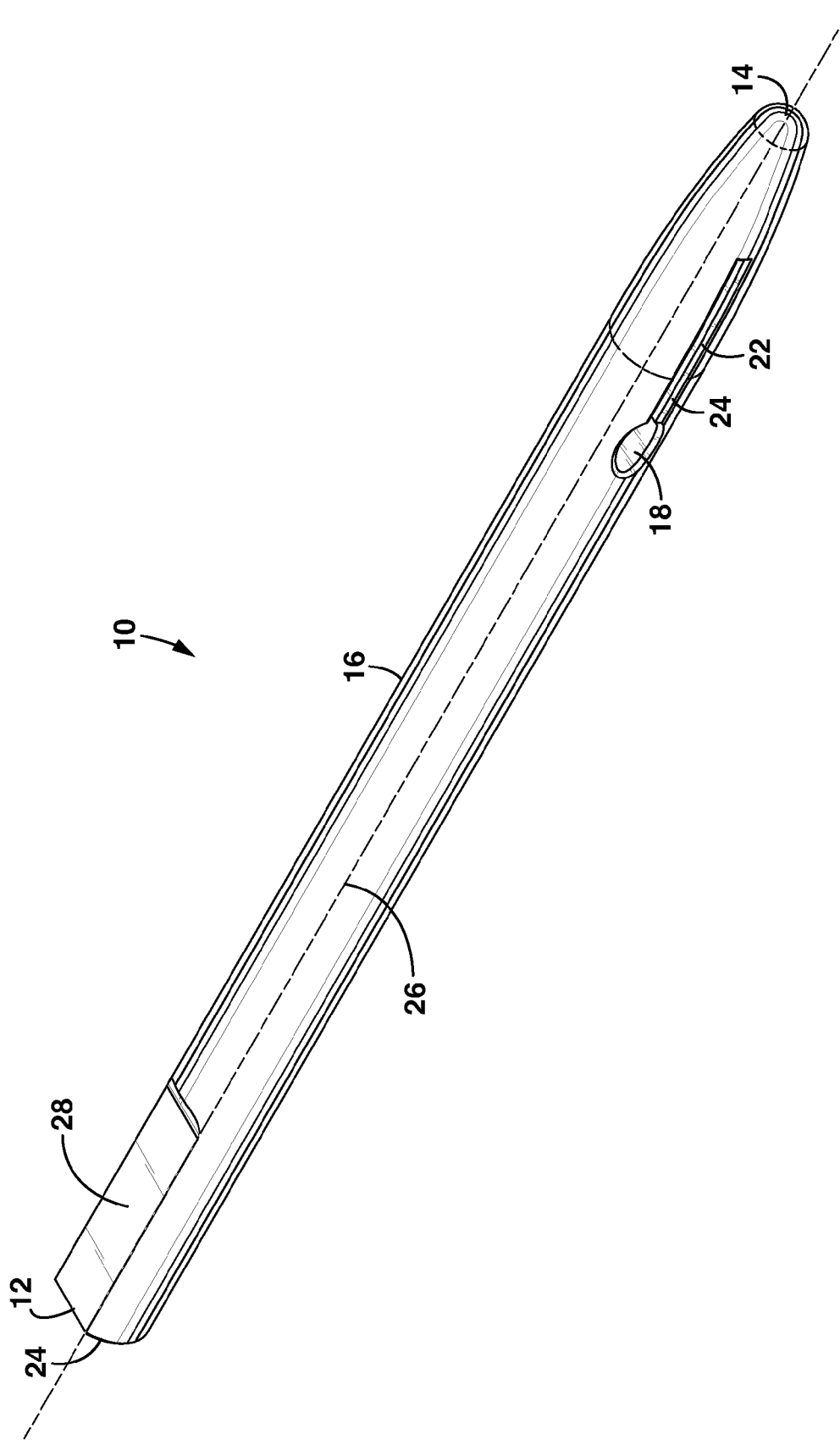
FIG. 7 illustrates a perspective view of the cable installation device according to another embodiment of the present invention.

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

Referring to FIG. 1 through FIG. 6, various views of the cable installation device 10 according to at least one embodiment of the present device disclosed herein is shown.

A cable installation device 10 can be constructed from metal, plastic, wood, carbon fiber or any other material known in the arts. A cable installation device 10 is comprised of a shank including a length 16 of material having a circular profile. In other embodiments the profile could be square, hexagonal, octagonal or any other profile or shape to cooperate engagingly with securing elements of a mechanical drill holder or chuck and suitable for insertion into thereof that tightens up around the shank, securing the cable installation device 10. Engagement of the shank with the securing element provides a secure grip and ensures a reliable and effective transmission of torque from the drill to the cable installation device 10. Cable installation device 10 has the left end 12 and the right end 14 and is about 0.39 inches in diameter, having a chamfer 24, about 0.03 inches wide, about the edge of the profile, and has a length 16 of about 7.5 inches. FIG. 5 presents a side view of the circular profile at left end 12 including the chamfer 24.

FIG. 4 presents a top cross-section view of a hole 18 including a left slot 20 and a right slot 22. The hole 18 is about 0.16 inches in diameter and is centered about 3.0 inches from a right end 14 on the central axis 26. The left slot 20 and the right slot 22 are positioned adjacent to each side of a hole 18 on a central axis 26 and each is about 0.07 inches in height and about 1.00 inches in length, having a chamfer 24, about 0.03 inches wide, about the front and back edges. FIG. 6 presents a side cross-section view of the hole 18 with the left slot 20 and the right slot 22.

The use of the present invention is described in the following example, which is set forth to aid in the understanding of the invention, and should not be construed to limit in any way the scope of the invention as defined in the claim which follow thereafter.

A cable installation device 10 is inserted into a drill or any other type of rotary tool powered by hand or electrical means to turn an auxiliary shaft type device either on left end 12 or right end 14. An amount of ripcord of about 12 inches may be exposed from an optical fiber cable. The ripcord is inserted through hole 18 and slid into either left slot 20 or right slot 22 and wound about the outer perimeter of cable installation device 10, by hand about two times, binding upon itself securely to the outside perimeter of cable installation device 10. The rotary tool is then activated further binding the ripcord about the outside perimeter of cable installation device 10. As the cable installation device 10 rotates about an axis 26, its perimeter rides along the length of the outside of an outer jacket of the optical fiber cable. The rotary force of the rotary tool winds the ripcord about the outside perimeter of the cable installation device 10, removing the ripcord from inside an outer jacket of a optical fiber cable to the outside of the optical fiber cable by winding the ripcord about cable installation device 10. Results are—the cable installation device 10 can easily utilize the ripcord to split the cable outer jacket easily, efficiently, safely in a time and labor saving way without harming the cable interior components.

Referring to FIG. 7 through FIG. 13 illustrate various views of the cable installation device 10 according to at least another embodiment of the present device.

A cable installation device 10 comprises a length 16 of material having, for example, a circular profile. In the illustrated embodiment, the cable installation device 10 includes a bevel 28 of about 0.34 inches wide by 1.25 inches long. Bevel 28 provides for fitting into a recess of, for example, of a rotary tool. The cable installation device 10 has a left end 12 and a right end 14 and is a generally circular shaft that has an about 0.50 inches diameter, having the chamfer 24, about 0.03 inches wide, about the edge of the profile, and has a length 16 of about 7.5 inches.

Hole 18 is an oval about 0.22 inches wide by 0.44 inches long and is centered about 2.0 inches from the right end 14 on the central axis 26. That is, the hole 18 has a centerline axis that intersects and is essentially perpendicular to the central axis 26. Preferably, the right end 14 has a conical like spline curve profile that begins at about 2 inches to about 0.125 inches from the right end 14. In this embodiment, the device 10 includes a single slot 22 extending toward the right (or distal) end opposite the left (or proximal) end. An amount of ripcord may be exposed from an optical fiber cable and inserted through the hole 18 and slid into slot 22 and wound about the outer perimeter of the cable installation device 10, binding upon itself securely to the outside perimeter of cable installation device 10. Cable installation device 10 further includes a friction surface, such as a knurled surface, for enhanced gripping of a ripcord about the outside perimeter of cable installation device 10. The rotary tool may then be activated to further bind the ripcord about the outside perimeter of cable installation device 10. As the cable installation device 10 rotates about an axis 26, the rotary force of the rotary tool winds the ripcord about the outside perimeter of the cable installation device 10, removing the ripcord from inside an outer jacket of a optical fiber cable to the outside of the optical fiber cable by winding the ripcord about cable installation device 10. The slot 40 is positioned adjacent the hole 38 on a central axis 46 and is about 0.07 inches in height and about 1.00 inches in length, having a chamfer 44, about 0.03 inches wide, about the front and back edges.

In other embodiments the stated dimensions could be plus or minus 25 percent of the stated dimensions to accommodate other sizes of fiber optic cable.

FIGS. 1 through 13 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. An apparatus for installing optical fiber cable, the apparatus comprising:
    a cable installation device comprising:
        a shaft length including a left end and a right end, at least one of the left and right ends including a chamfer about the edge of the at least one of the left and right ends and wherein the at least one of the left and right ends are engageable with a rotary tool;
        a through-going hole centered on a central axis of the shaft length between the left end and the right end adapted for receiving a ripcord of an optical fiber cable; and
        at least one through-going slot adjacent to the hole; wherein the through-going hole is an oval of about 0.22 inches wide by 0.44 inches long and is centered about 2 to 3 inches from the right end, and wherein the at least one through-going slot is about 0.07 inches in height and about 1.00 inches in length and includes a chamfer about 0.03 inches wide about the front and back edges of the at least one through-going slot.

2. The apparatus of claim 1 wherein the cable installation device is constructed from material comprising one of metal, plastic, wood, and carbon fiber.

3. The apparatus of claim 1 wherein the shaft length includes a circular profile.

4. The apparatus of claim 1 wherein the shaft length includes one of a square, hexagonal, and octagonal profile.

5. The apparatus of claim 1 wherein the shaft length is about 7.5 inches.

6. The apparatus of claim 1 wherein at least one of the left and right ends include a diameter of about 0.50 inches.

7. The apparatus of claim 6 wherein the chamfer is about 0.03 inches wide about the edge of the profile.

* * * * *